United States Patent [19]

Nilsson

[11] Patent Number: 4,565,464
[45] Date of Patent: Jan. 21, 1986

[54] CLAMPING JOINT

[75] Inventor: Sven W. Nilsson, Partille, Sweden

[73] Assignee: SKF Nova AB, Goteborg, Sweden

[21] Appl. No.: 649,948

[22] Filed: Sep. 12, 1984

[30] Foreign Application Priority Data

Oct. 5, 1983 [SE] Sweden ................................. 8305459

[51] Int. Cl.⁴ .............................................. F16B 2/02
[52] U.S. Cl. ..................................... 403/290; 403/344
[58] Field of Search ............... 403/344, 312, 313, 289, 403/290

[56] References Cited

U.S. PATENT DOCUMENTS 3,307,418  3/1967  Greene ............................ 403/362 X
3,554,589  1/1971  Boggs .................................. 403/313
3,917,424  11/1975  Zugel ............................... 403/344 X

FOREIGN PATENT DOCUMENTS 618914  9/1935  Fed. Rep. of Germany ...... 403/313
250223  12/1926  United Kingdom ................ 403/313

Primary Examiner—Andrew V. Kundrat
Attorney, Agent, or Firm—Eugene E. Renz, Jr.

[57] ABSTRACT

An element intended for connection to a shaft arranged in a bore in the element comprises two elastically deformable portions created by providing slots perpendicular and parallel to the axis of the bore, respectively. The portions each comprise a part of the wall of the bore and are arranged symmetrically with respect to the bore. Screws are used for deforming the portions so that a shaft situated in the bore is clamped to the element.

4 Claims, 1 Drawing Figure

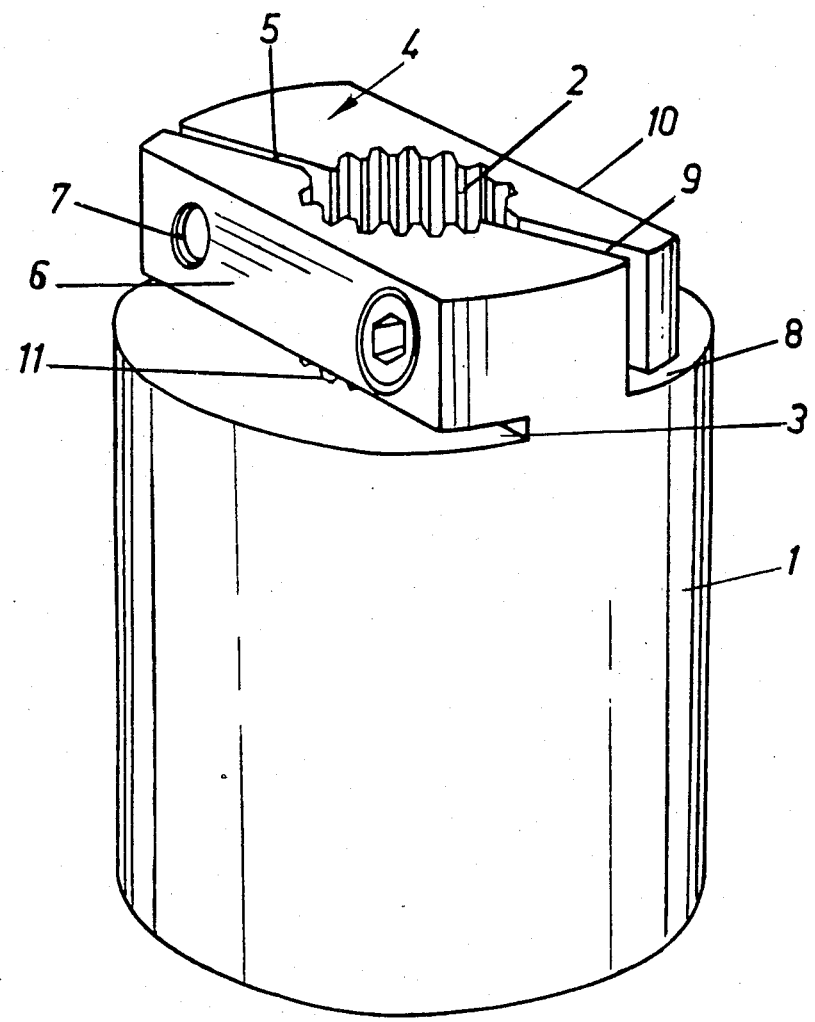

CLAMPING JOINT

BACKGROUND OF THE INVENTION

The present invention relates to devices for mounting machine elements on shaft members or the like by means of a clamping device.

The device may be used e.g. in splines couplings or friction couplings for shaft connections, i.e. in applications where an element is to be connected to a shaft which is arranged in a bore in the element.

Clamping joints of various kinds are known in the art. They generally comprise a number of relatively movable elements with conical co-operating sliding surfaces, or a sleeve-like element with a longitudinal slot whose width can be adjusted by a screw which extends across the slot, as shown in e.g. Swedish Pat. No. 225,621. Devices of the first mentioned type comprise a plurality of parts which must be manufactured very accurately and require careful handling. Furthermore, the coupling element is usually displaced axially during mounting, which may constitute a disadvantage. Devices of the last mentioned type comprise an element which is asymmetrical in relation to the central axis and is deformed asymmetrically during mounting, which causes unbalance problems in applications in which fast rotation of the shaft occurs and the elements are large and heavy in order to be able to transmit great forces.

Known devices may possibly comprise a separate sleeve or ring which surrounds and constitutes a clamping member for a resiliently deformable portion of an otherwise rigid member which is to be connected to a shaft or the like, but the member must in that case be designed in a special way in order to allow deformation, and the loose sleeve makes a complication of the coupling device.

SUMMARY OF THE INVENTION

The purpose of the invention is to provide a device of the kind defined in the introduction of the specification, which device can be manufactured and handled in a simple manner and does not comprise any loose parts, and which can be clamped firmly without any axial displacement and retains its symmetrical shape in relation to its central axis during the clamping operation. This is achieved by providing the device with the characterizing features stated in claim 1. Advantageous embodiments of the invention are defined in the other claims.

BRIEF DESCRIPTION OF THE DRAWING

The following is a detailed description of the invention made with reference to the accompanying drawing, which shows a perspective view of a device designed according to a suitable embodiment of the invention.

DESCRIPTION OF THE PREFERRED EMBODIMENT

An element 1, which is shown as mainly cylindrical, is provided with a central axial bore 2 in which e.g. a shaft end can be introduced for connection to the element. A first slot 3 extends through a portion of the element 1 in a plane mainly perpendicular to the axis of the bore 2 and cuts through a portion of the bore wall. The bore preferably extends a distance past the slot counted from the end surface 4 of the element 1. A second slot 5 runs mainly parallel to the axis of the bore 2 through a portion of the element and extends axially from the end surface 4 of the element 1 to the slot 3 and radially from the wall of the bore 2 to the envelope surface of the element 1. The slots 3, 5, the wall of the bore 2, the end surface 4 and the envelope surface of the element therewith delimit a tongue-like portion 6 of element 1, which is deformable due to the inherent elasticity of the material of the element 1. Means, herein shown in the shape of a screw 7 which extends across the slot 5 and into a threaded bore in the portion 6, are provided for causing variation of the width of the slot 5 by deforming the portion 6, thereby causing variation of the circumference of the part of the bore 2 which extends from the end surface 4 of the element 1 to the slot 3.

A shaft arranged in the bore 2 will thus by tightening of the screw 7 be clamped into frictional connection to the element 1. An improved torque transmitting ability between the element 1 and a shaft arranged in the bore 2 is achieved if the wall of the bore is provided with splines which cooperate with corresponding grooves in the shaft. The splines are preferably extending from the end surfaces 4 of the element 1 and past the slot 3, so that torque is also transmitted by portions of the element 1 which are not partly cut off by slots.

The member which is situated in the bore 2 can be squeezed forcefully and symmetrically when a further slot 8 corresponding to the slot 3 is arranged diametrically opposing the slot 3 with regard to the bore 2, leaving an unslotted portion of the element 1 between the slots 3 and 8, and a further slot 9 corresponding to the slot 5 is provided diametrically opposing the slot 5 with regard to the bore 2. A tongue-like elastically deformable portion 10 corresponding to the portion 6 is therewith created in opposition to the portion 6, and the width of the slot 9 can be adjusted by the screw 11 corresponding to the screw 7. By tightening the screws 7, 11 equally, a shaft can be clamped with a great force and remain centered in the bore of the element 1.

For manufacturing reasons the bottom of the slots 3, 8 is preferably arc-shaped and the slots 5, 9 are straight and arranged in the same plane, which contains the axis of the bore 2, the slots 5, 9 constituting chords of the arcs describing the bottom shape of the slots 3 and 8, respectively.

The deformable portions 6, 10 are preferably each provided with a flat part on their outer surfaces. The flat parts are suitably parallel to each other and to the axis of the bore 2, and the slots 5, 9 are arranged at an angle to the respective flat parts. The bores for the screws 7, 11 can easily be machined from such flat parts, and the provision of the flat parts also results in improved deformation properties of the portion 6, 10. The flat parts can also act as surfaces for attachment to a wrench or as a torque transmitting connection of e.g. a shaft provided with a transversal recess in its end surface.

In a device designed as shown in the drawing, in which the wall of the bore 2 is provided with longitudinal ridges and grooves, a shaft which is situated in the bore and provided with corresponding grooves and ridges will be turned somewhat in relation to the element 1 upon tightening of the screw 7, 11 so that the portions 6, 10 are deformed. Thereby a forceful friction grip is obtained along the whole portion of the bore 2 which is provided with grooves and ridges, which portions may possibly extend along the entire element 1.

What is claimed is:

1. A device for clamping onto a shaft, comprising:
a body element (1) having a bore (2) passing through one end thereof for receiving said shaft and forming a bore wall therein, said body element (1) having a first slot (3) extending through a portion of said body in a plane substantially perpendicular to the axis of said bore and extending through a portion of said bore wall, and having a second slot (5) in a plane substantially parallel to said axis and extending axially through a portion of said one end such that it connects with said first slot (3), the result of said slots and bore forming a first deformable portion (6) in said one end and having third (8) and fourth (9) slots corresponding to and diametrically opposed to said first (3) and second (5) slots, respectively and lying in the same planes thereof, forming a second deformable portion (10) symmetrically disposed to said axis in relation to said first deformable portion (6) said deformable portions connected to said body portion at diametrically opposed locations and means (7) for varying the widths of said second (5) and fourth (9) slots so that said first (6) and second (10) deformable portions clamp said shaft therebetween, whereby a symmetrical clamping device is provided, said body element and first and second deformable portions forming a unitary, one-piece assembly.

2. A clamping device as claimed in claim 1 wherein said body element (1) and deformable portions (6, 10) are of one-piece unitary construction and wherein said means for varying the widths of the slots (5, 9) to achieve a clamping action comprise screw members (7, 11) extending through the slots and engageable in threaded bores in said deformable portions.

3. A clamping device as claimed in claim 2 wherein each of said deformable portions (6, 10) has a flat surface which is generally parallel and forms an angle with said slots (5, 9), said threaded bores formed in said flat surfaces.

4. A clamping device as claimed in claim 1 wherein said bore 2 is provided with a plurality of axial splines extending from an axial end face of said body element through said deformable portions (6, 10) and a predetermined distance past said first and third slots (3, 8) arranged perpendicular to the axis of the bore (2).

* * * * *